United States Patent
Kruse et al.

(10) Patent No.: US 12,496,920 B2
(45) Date of Patent: Dec. 16, 2025

(54) MOTOR VEHICLE COMPRISING A HIGH-VOLTAGE ON-BOARD ELECTRICAL SYSTEM

(71) Applicant: Volkswagen Aktiengesellschaft, Wolfsburg (DE)

(72) Inventors: Tom Kruse, Bad Gandersheim (DE); Ralf Pfennigwerth, Lehre (DE); Simon Stutz, Hardegsen (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 96 days.

(21) Appl. No.: 18/527,087

(22) Filed: Dec. 1, 2023

(65) Prior Publication Data
US 2024/0181907 A1     Jun. 6, 2024

(30) Foreign Application Priority Data
Dec. 6, 2022 (DE) .......................... 102022213105.3

(51) Int. Cl.
*B60L 53/20* (2019.01)

(52) U.S. Cl.
CPC ........... *B60L 53/20* (2019.02); *B60L 2210/12* (2013.01); *B60L 2210/14* (2013.01)

(58) Field of Classification Search
CPC .......... B60L 50/15; B60L 1/006; B60L 53/80; B60L 50/64; B60L 50/66; B60L 58/26; Y02T 10/70; Y02T 10/7072
USPC ........... 307/10.1, 9.1; 320/109, 104; 701/22; 318/139; 180/65.1, 65.29, 65.265
See application file for complete search history.

(56) References Cited

U.S. PATENT DOCUMENTS

2012/0141895 A1   6/2012  Kwon et al.
2021/0091436 A1*  3/2021  Haring ................ H01M 50/258

FOREIGN PATENT DOCUMENTS

| DE | 102013210293 A1 | 12/2014 |
| DE | 102017218252 A1 | 4/2019 |
| DE | 202019101228 U1 | 6/2019 |
| DE | 102018207797 B3 | 11/2019 |
| DE | 102018213897 A1 | 2/2020 |

(Continued)

OTHER PUBLICATIONS

Priority German Application No. 102022213105.3. Office Action (Aug. 21, 2023).

*Primary Examiner* — Elim Ortiz
(74) *Attorney, Agent, or Firm* — Peter Zura; LOZA & LOZA, LLP

(57) ABSTRACT

A motor vehicle comprising a high-voltage on-board electrical system including a high-voltage battery, wherein the high-voltage battery includes a first energy storage system and a second energy storage system. The motor vehicle also includes two low-voltage on-board electrical systems and a first DC to DC converter for converting a high voltage into a low voltage, wherein the first energy storage system, the second energy storage system and the two low-voltage networks are connected to one another by means of the first DC to DC converter, and wherein a second DC to DC converter is connected in each case between the first DC to DC converter and the energy storage banks for voltage adaptation, and/or wherein a third DC to DC converter is connected in each case between the first DC to DC converter and the low-voltage networks for voltage adaptation.

20 Claims, 4 Drawing Sheets

(56) References Cited

FOREIGN PATENT DOCUMENTS

| DE | 102018213901 | A1 | | 2/2020 |
| DE | 102019134213 | A1 | | 6/2021 |
| DE | 102020214699 | A1 | | 5/2022 |
| DE | 102021116525 | A1 | * | 9/2022 |

* cited by examiner

MOTOR VEHICLE COMPRISING A HIGH-VOLTAGE ON-BOARD ELECTRICAL SYSTEM

RELATED APPLICATIONS

The present application claims priority to German Patent Application No. DE 10 2022 213 105.3 filed Dec. 6, 2022, the contents of which is incorporated by reference in its entirety herein.

TECHNICAL FIELD

The present disclosure relates to a motor vehicle, such as an electrically-driven motor vehicle comprising a high-voltage on-board electrical system.

BACKGROUND

A motor vehicle that uses x-by-wire applications, such as steer-by-wire or brake-by-wire, is provided with the highest possible failure safety of the energy supply system for this application since the risk of an accident is comparatively high if the energy supply for such a driving safety-related applications should fail.

A range of the voltage provided by the battery is comparatively large since driving ranges have increased and this is needed for certain embodiments of a battery used to supply energy. However, when a (voltage) range is comparatively large, the efficiency of a voltage conversion between different voltage levels for an on-board electrical system of the motor vehicle is drastically reduced.

An energy storage system comprising several cell units is known from DE 10 2017 218 252 A1, which each include at least one battery cell, and further comprising several converter devices, which each are assigned to a respective of the cell units and connected in parallel to the assigned cell unit and which are designed to convert a first voltage, which can be tapped at the assigned cell unit and provided at a converter input of the respective converter device, into a second voltage, which is provided at a converter output of the respective converter device.

A fault-tolerant on-board electrical system module comprising two DC to DC converters connected in series is disclosed in DE 10 2018 213 901 A1.

SUMMARY

Aspects of the present disclosure are directed to providing a motor vehicle in which the probability of a failure of the energy supply for a consumer, which may be provided for an x-by-wire application, is as low as possible, and/or in which the efficiency of a voltage conversion between a high-voltage network and a low-voltage network of the on-board electrical system thereof is as high as possible.

Some of the aspects are achieved by the features of the independent claims. Advantageous refinements and embodiments are the subject matter of the dependent claims.

In some examples, the motor vehicle comprises an on-board electrical system having a high-voltage on-board electrical system, the DC voltage of which is greater than 60 V, in particular between 100 V and 1500 V, and preferably between 140 V and 800 V. The high-voltage on-board electrical system comprises a high-voltage battery, by means of which the electrical DC voltage of the high-voltage on-board electrical system is provided. The high-voltage battery comprises a first energy storage system and a second energy storage system. The first and second energy storage systems each comprise at least one battery cell, which is designed, for example, as a lithium-ion battery cell, and preferably a plurality of battery cells, which are connected in series and/or parallel to one another. For example, the battery cells of the respective energy storage system are combined in one or more cell modules (battery modules). The first and second energy storage systems preferably have an identical design in terms of the number and interconnection of the battery cells thereof. In particular, the first and second energy storage systems provide the same voltage.

The on-board electrical system of the motor vehicle may further include two low-voltage on-board electrical systems (low-voltage networks), the DC voltage of which is smaller than or equal to 60 V, and in particular 12 V, 14.5 V, 24 V or 48 V. The two low-voltage on-board electrical systems are preferably galvanically isolated from one another, that is, connected to one another so as not to be electrically conducting.

In some examples, the motor vehicle may also comprise a first DC to DC converter, which is provided and configured to convert a high voltage into a low voltage and/or vice versa, that is, to convert a low voltage into a high voltage. The first DC to DC converter can thus preferably be operated bidirectionally.

The two low-voltage networks, the first energy storage system and the second energy storage system, are connected to one another by way of the (shared) first DC to DC converter. In other words, the first energy storage system, the second energy storage system and the two low-voltage on-board electrical systems are connected to the first DC to DC converter, in particular to a respective connection of the DC to DC converter. The first DC to DC converter may be configured as a four-port DC to DC converter. The first DC to DC converter may thus be configured as a multiple DC to DC converter. Electrical energy can be transmitted by means of the first DC to DC converter from one of the two energy storage systems to the other energy storage system, to one of the two low-voltage networks and/or to both low-voltage networks.

In some examples, electrical energy may be transmitted for this purpose from one of the low-voltage networks to the other low-voltage network, to one of the two energy storage systems and/or to both energy storage systems. An operation of consumers in the low-voltage on-board electrical systems is thus made possible by way of one or both energy storage systems and/or by energy being fed back from one of the two low-voltage on-board electrical systems to the energy storage systems, to provide high availability and high failure safety. In the event of a fault of the battery, for example, one of the energy storage systems thereof can be switched off, and both low-voltage on-board electrical systems can continue to be supplied with electrical energy by way of the other energy storage systems.

DESCRIPTION OF THE DRAWINGS

Exemplary embodiments of the present disclosure will be described hereafter in greater detail based on drawings. In the drawings.

DETAILED DESCRIPTION

Figure 1:
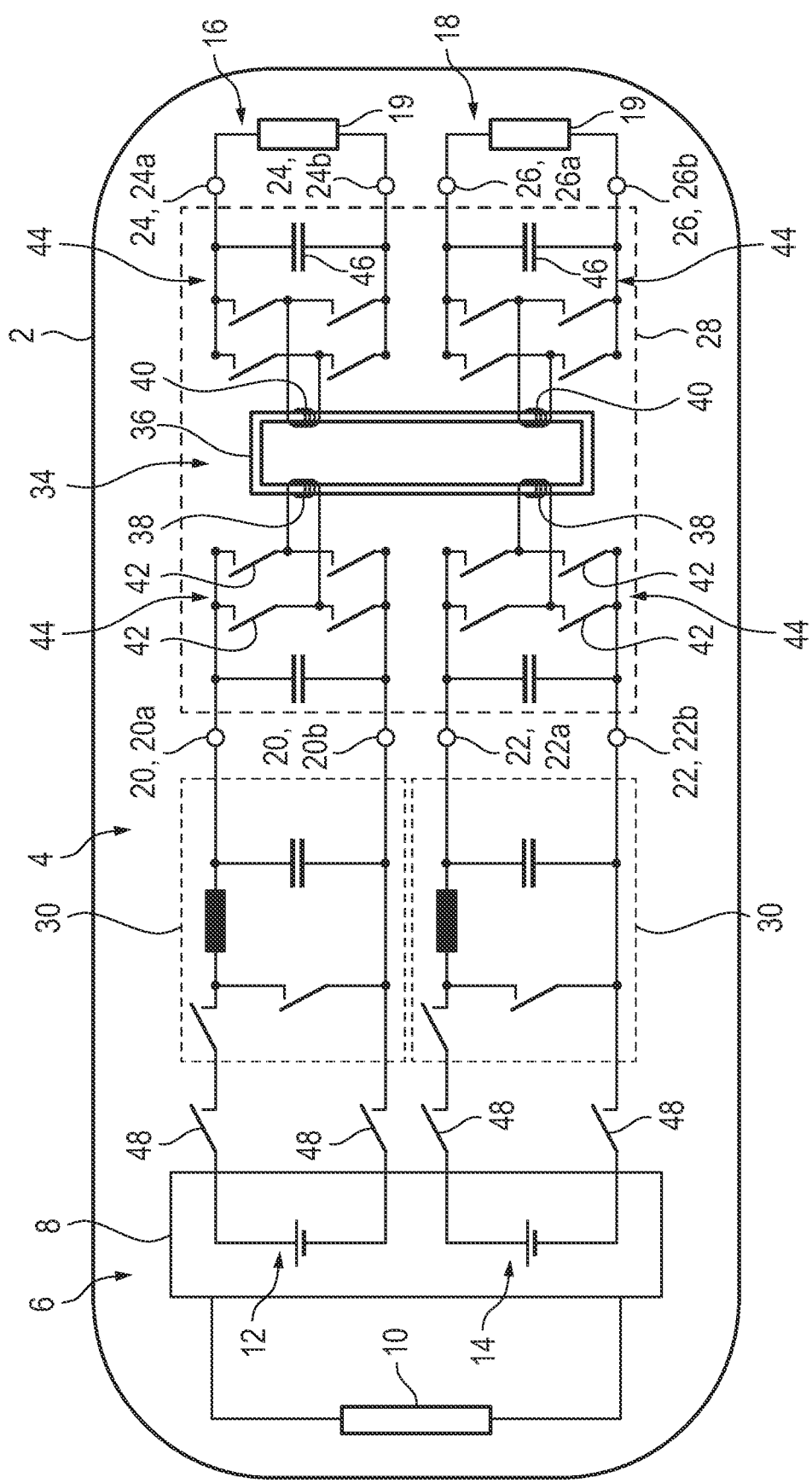
FIG. 1 shows a schematic illustration of a block diagram of a motor vehicle comprising an on-board electrical system, comprising a high-voltage network, the high-voltage battery of which comprises two energy storage systems, which are connected to two low-voltage on-board electrical systems by way of a shared first DC to DC converter, wherein in each case a second DC to DC converter is connected between the first DC to DC converter and the energy storage systems, according to come aspects of the present disclosure.

Like parts and variables are denoted by like reference numerals in all the figures.

In some examples described herein, For a particularly high efficiency during the voltage conversion by way of the first DC to DC converter, the converter may be configured in such a way that the ratio of the high voltage to the low voltage for all voltage conversion processes is always the same, for example, 10:1.

So as to adapt the voltage, a second DC to DC converter may be connected in each case between the first DC to DC converter and the energy storage systems. This means that a second DC to DC converter is connected between the first DC to DC converter and the first energy storage system, and a further second DC to DC converter is connected between the first DC to DC converter and the second energy storage system. In this way, it is made possible to equalize voltage changes of a voltage that is provided by one of the two or by both energy storage systems in such a way that this voltage, after having been converted by way of the first DC to DC converter, has a value that is intended for the low-volt on-board electrical system.

In some examples, a third DC to DC converter may be connected in each case between the first DC to DC converter and the low-voltage on-board electrical systems for this purpose. In other words, a third DC to DC converter is connected between the first DC to DC converter and one of the low-voltage on-board electrical systems, and a further third DC to DC converter is connected between the first DC to DC converter and the other low-voltage on-board electrical system. In summary, it is made possible to equalize a voltage change of a voltage that is provided by one of the two or by both energy supply systems and reduced by way of the first DC to DC converter, and to change the reduced voltage to a value that is intended for the low-voltage on-board electrical systems.

Such a voltage change occurs, for example, when the charge state of the battery cells changes or in the event of a defect of one of the battery cells, which is then disconnected. Furthermore, an on-board electrical system configured in this way, comprising a first DC to DC converter and second and/or third DC to DC converters can be used for several high-voltage battery types having differing battery voltages.

As disclosed herein, a multi-stage voltage conversion from the voltage of the respective energy storage system to the voltage of the low-voltage on-board electrical systems, or vice versa, is carried out by way of the first DC to DC converter, by way of the second DC to DC converter and/or by way of the third DC to DC converter. Advantageously, the input voltage for the first DC to DC converter and/or the output voltage of the first DC to DC converter can be adapted for optimized efficiency for a consumer of the respective low-voltage on-board electrical system or for the respective energy storage system by way of the second or by way of the third DC to DC converters. The efficiency of such a voltage-adapted conversion is comparatively high compared to a voltage conversion solely by way of the first power converter.

The motor vehicle described herein may be configured as an electrically driven motor vehicle. For this purpose, the motor vehicle comprises a traction battery, which provides electrical energy for the (traction) drive. The traction battery is in particular the high-voltage battery. The motor vehicle is, for example, a commercial vehicle, such as a truck or a bus. Particularly preferably, however, the motor vehicle is a passenger car.

In some examples, at least one assistance system may be operated by means of at least one of the low-voltage on-board electrical systems, which is used, for example, to provide automated driving functions. The assistance system is in particular a steering system, an autopilot, a lane-keeping assistance system, an emergency braking assistance system or another assistance system, in particular for an autonomously driving vehicle according to Level 3, Level 4 or Level 5 according to the "SAE J3016" standard. In summary, the motor vehicle preferably comprises several assistance systems, which are operated by means of the low-voltage on-board electrical systems, wherein one of these assistance systems is used in particular to operate the possibly present traction drive, a possibly present braking system and/or a steering system.

In some examples, the first energy storage system may be electrically disconnected from the second energy storage system so that, in the event of a fault, one of the energy storage systems, for example in the event of a short circuit of a battery cell of this faulty energy storage system, the fault is prevented from propagating to the energy storage system that is still fault-free.

Moreover, the first energy storage system and/or the second energy storage system may be disconnected from the first DC to DC converter, that is, can be electrically disconnected. In the event of a fault, thus only the fault-free energy storage system is coupled to the first DC to DC converter.

For example, the first energy storage system and the second energy storage system are connected in series. As an alternative, the first energy storage system and the second energy storage system are connected in parallel to one another. Depending on whether first and second energy storage systems are connected in series or in parallel to one another, a voltage that is provided by the high-voltage battery or a current that can be provided thereby is accordingly reduced in the event of a failure of one of the energy storage systems due to a fault and upon disconnection of this failed energy storage system. However, at least the safety-relevant consumers can continue to be operated by way of the other energy storage system. In summary, a high failure safety for the safety-relevant consumers, such as, for example, for a device for an x-by-wire application, is implemented.

In some examples, the second and/or third DC to DC converters may each be configured as a buck converter, a boost converter or as a buck-boost converter.

In some examples, the first DC to DC converter, the respective second DC to DC converter and/or the respective third DC to DC converter are each a bidirectional DC to DC converter. In this way, it is possible both to provide electrical energy from the high-voltage battery for the low-voltage networks, and to transmit energy from the low-voltage networks to the high-voltage network, and in particular to the high-voltage battery. In other words, it is made possible to supply electrical energy from the high-voltage on-board electrical system to one or both low-voltage on-board electrical systems and/or back. In the process, the different levels of the electrical voltages are adapted to one another by means of the DC to DC converters so that electric energy is transferred.

As an alternative, the first, second and/or third DC to DC converters are in each case a unidirectional DC to DC converter, wherein the energy storage systems at the input side and the first DC to DC converter at the output side are connected to the respective second DC to DC converter, and wherein the first DC to DC converter on the input side and the low-voltage on-board electrical systems on the output side are connected to the respective third DC to DC converter.

In some examples, the first DC to DC converter may be configured as a DC to DC converter with galvanic isolation.

In some examples, to the extent that the first DC to DC converter is already a DC to DC converter with galvanic isolation, each of the second and/or each of the third DC to DC converters may be configured in a cost-saving manner as a DC to DC converter without galvanic isolation.

In some examples, the first DC to DC converter may include a transformer having a core, and in particular a ferromagnetic core. Two first coils and two second coils are wound around the core. The coils are not electrically contacted with one another. For example, the coils are wound next to one another on the core. As an alternative, the coils are wound on top of one another or so as to be entwined with one another. The two first coils expediently have the same number of windings. The two second coils expediently have the same number of windings. For example, the ratio between the number of windings of the first coils and the number of windings of the second coils is 3:1, 5:1, 10:1, 20:1, 40:1 or 100:1.

Each of the first coils may be connected by means of a power converter to a respective energy storage system, that is, is electrically connected thereto. In other words, the first energy storage system is connected by means of one of the power converters to one of the first coils, and the second energy storage system is connected by means of a further power converter to the other first coil.

Furthermore, each of the second coils may be connected by means of a power converter to the respective low-voltage network, that is, is electrically connected thereto. In other words, the one of the two low-voltage on-board electrical systems is connected by means of one of the power converters to one of the second coils, and the other low-voltage on-board electrical system is connected by means of a further power converter to the other second coil.

The power converters are provided and may be configured to convert a DC voltage into an AC voltage and/or vice versa, that is, to convert an AC voltage into a DC voltage. In other words, the power converters can be operated as rectifiers and/or as inverters. In particular, the power converters are each designed based on a B4 circuit.

Figure 2:
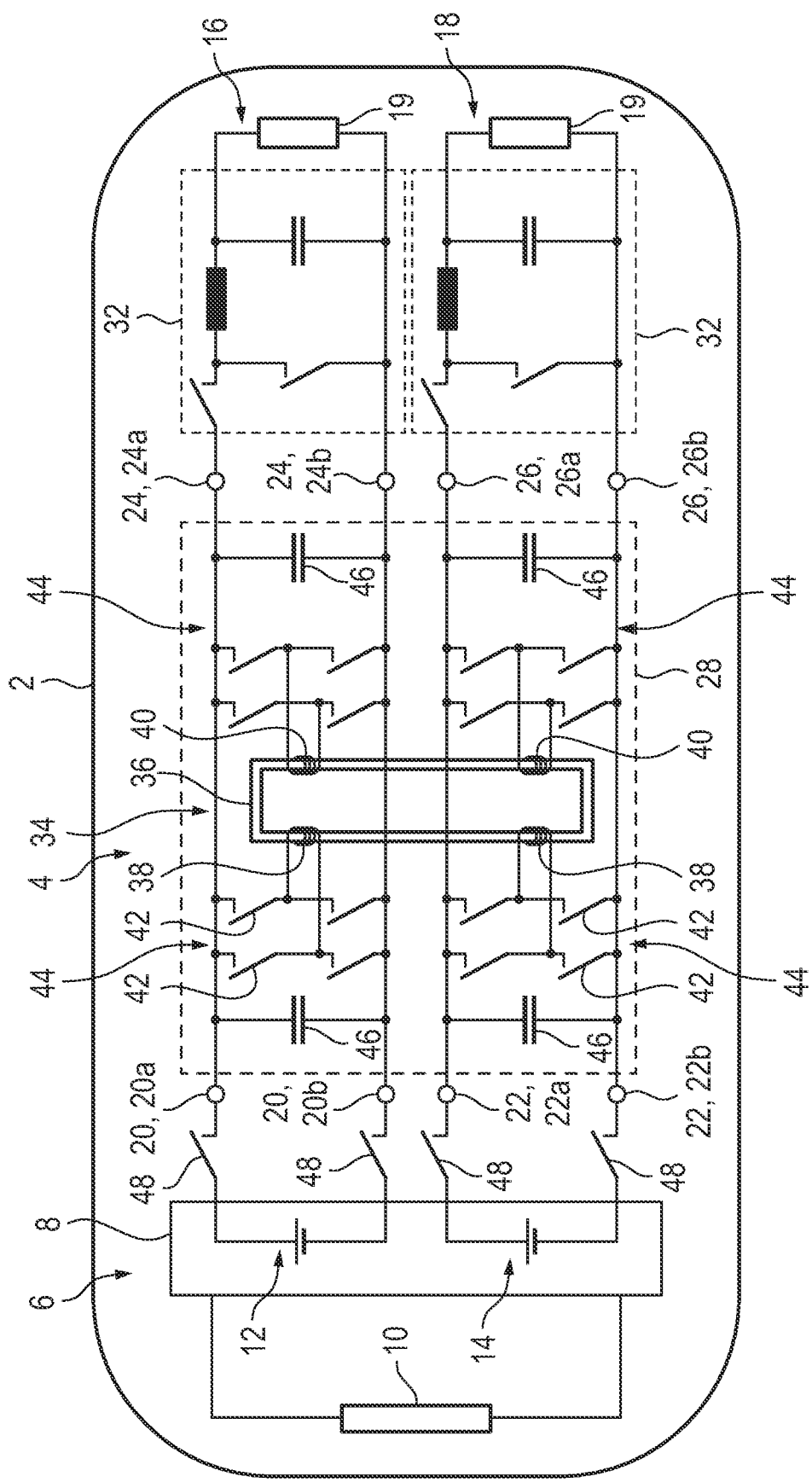
FIG. 2 shows a schematic illustration of a block diagram of a motor vehicle comprising an on-board electrical system according, wherein the energy storage systems thereof are connected to the low-voltage on-board electrical systems by way of the first DC to DC converter, and wherein in each case a third DC to DC converter is connected between the first DC to DC converter and the low-voltage on-board electrical systems, according to come aspects of the present disclosure.
Figure 3:
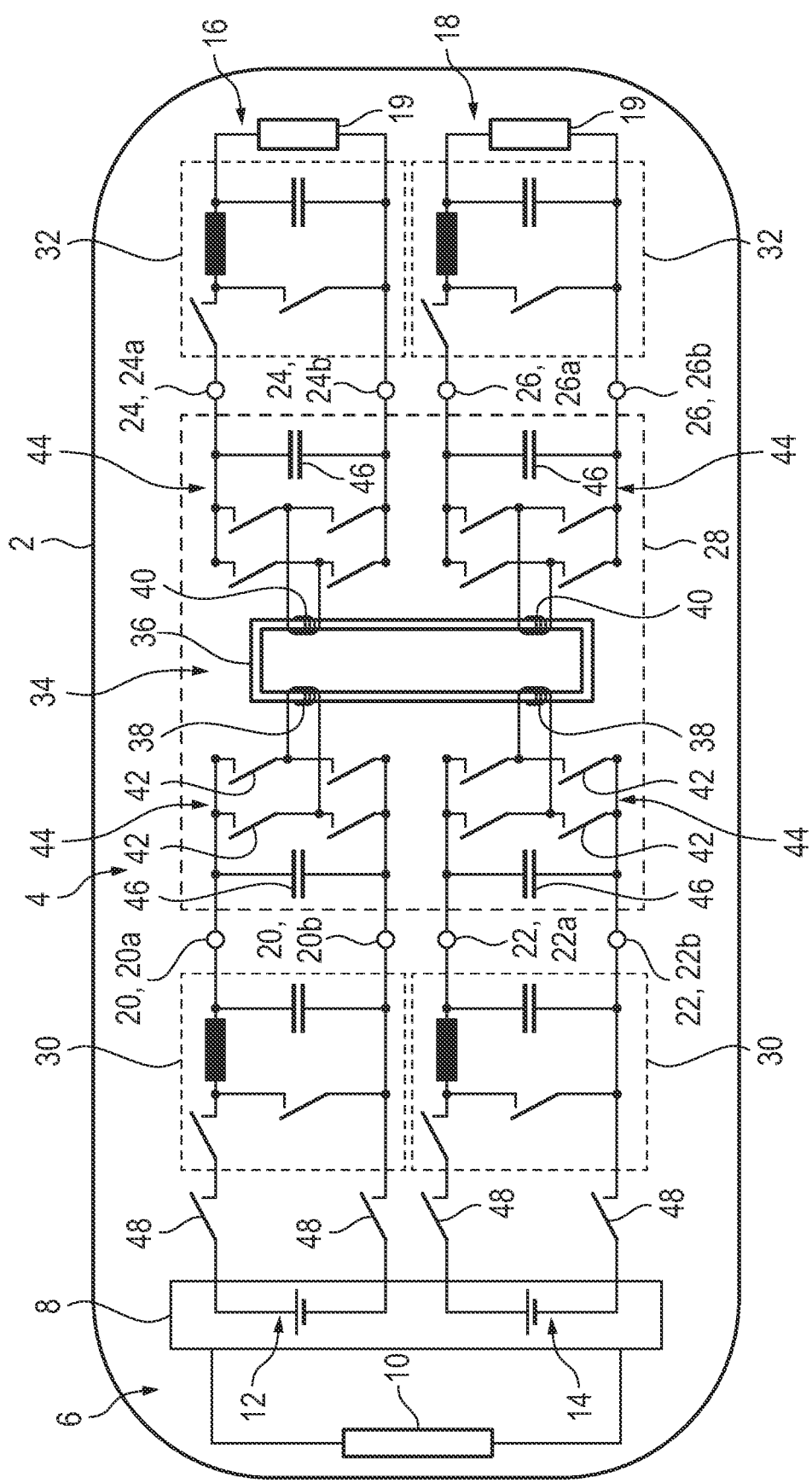
FIG. 3 shows a schematic illustration of a block diagram of a motor vehicle comprising an on-board electrical system, wherein the energy storage systems thereof are connected to the low-voltage on-board electrical systems by way of the first DC to DC converter, wherein in each case the second DC to DC converter is connected between the first DC to DC converter and the energy storage systems, and wherein in each case a third DC to DC converter is connected between the first DC to DC converter and the low-voltage on-board electrical systems, according to come aspects of the present disclosure.
Figure 4:
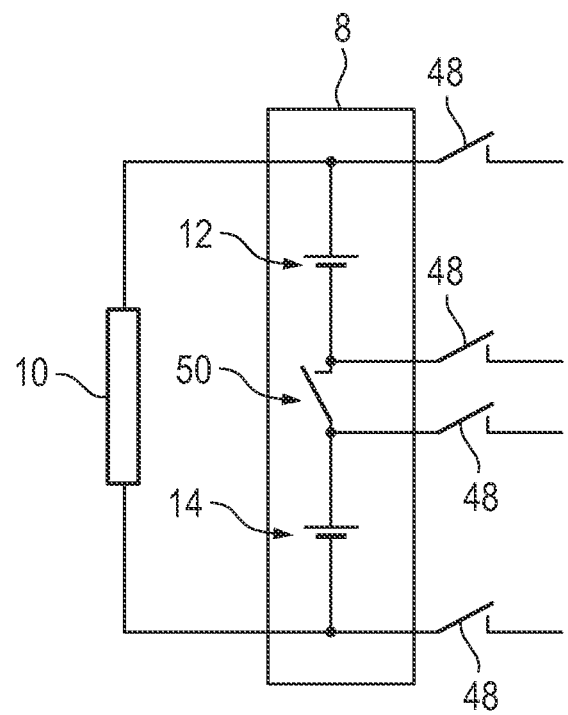
FIG. 4 shows a schematic illustration of a block diagram of the high-voltage battery, wherein the first and second energy storage systems are connected in series, according to come aspects of the present disclosure.
Figure 5:
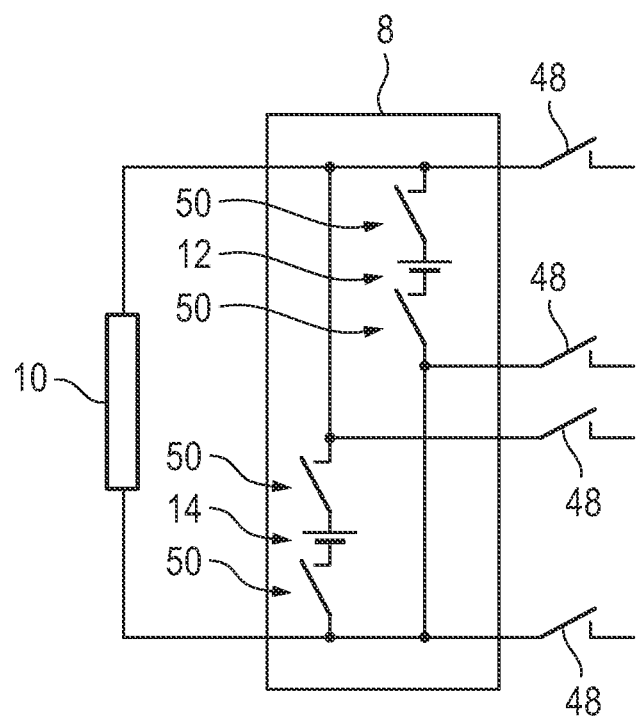
FIG. 5 shows a schematic illustration of a block diagram of an alternative embodiment of the high-voltage battery, wherein the first and second energy storage systems are connected in parallel to one another, according to come aspects of the present disclosure.

FIGS. 1 to 3 schematically show a motor vehicle 2, in particular an electrically driven motor vehicle. The on-board electrical system 4 of the vehicle comprises a high-voltage on-board electrical system 6 including a high-voltage battery 8 (traction battery). The high-voltage battery 8 provides electrical energy for a high-voltage consumer 10, in particular a traction drive, of the motor vehicle 2. The consumer 10 is connected to the high-voltage battery 8 for this purpose in a manner that is not shown in greater detail. The traction battery 8 comprises a first energy storage system 12, which is also referred to as a first energy storage bank, and a second energy storage system 14, which is also referred to as a second energy storage bank. Each of the two energy storage systems 12, 14 comprises a plurality of battery cells, which are interconnected in series and/or in parallel to one another. For example, the first energy storage system 12 and the second energy storage system 14 each provide a voltage between 140 V and 460 V. The interconnection of the two energy storage systems 12, 14 is not shown in greater detail in FIGS. 1 to 3. FIGS. 4 and 5 each by way of example show a variant of the interconnection of the first and second energy storage systems 12, 14 in a schematic representation, in which the energy storage systems 12, 14 are connected in series or in parallel to one another.

The on-board electrical system 4 furthermore comprises two low-voltage on-board electrical systems 16 and 18, each including a low-voltage consumer 19. The DC voltage in the low-voltage on-board electrical systems 16, 18 is 14.5 V in each case, for example.

A first DC to DC converter is connected between the high-voltage on-board electrical system 6, namely between the two energy storage systems 12, 14 and the two low-voltage on-board electrical systems 16, 18. The energy storage systems 12, 14 and the two low-voltage on-board electrical systems 16, 18 are thus connected to one another by means of the first DC to DC converter 28. The first DC to DC converter 28 thus has four connections 20, 22, 24 and 26. The first energy storage system 12 is connected to the first connection 20, namely to the connecting points 20a and 20b thereof, and the second energy storage system 14 is connected to the second connection 22, namely to the connecting points 22a and 22b thereof. The first of the two low-voltage on-board electrical systems 16 is connected to the third connection 24, namely to the connecting points 24a and 24b thereof, and the second of the two low-voltage on-board electrical systems 18 is connected to the fourth connection 26, namely to the connecting points 26a and 26b thereof.

one for each of the energy storage systems 12, 14 and one for each of the low-voltage on-board electrical systems 16, 18. The first DC to DC converter 28 is thus a four-port DC to DC converter. The first DC to DC converter 28 is used to convert the high voltage of the first and/or second energy storage systems 12, 14 into the low voltage for the low-voltage on-board electrical systems 16, 18, and vice versa.

In a first variant of the motor vehicle 2 according to FIG. 1, a second DC to DC converter 30 is connected in each case between the first DC to DC converter 28 and the energy storage systems 12, 14. This means that one of the second DC to DC converters 30 is connected between the first connection 20 and the first energy storage system 12. Moreover, the other second DC to DC converter 30 is connected between the second connection 22 and the second energy storage system 14.

In a second variant of the motor vehicle 2 according to FIG. 2, a third DC to DC converter 32 is connected in each case between the first DC to DC converter 28 and the low-voltage on-board electrical systems 16, 18. This means that one of the third DC to DC converters 32 is connected between the third connection 24 and the first low-voltage on-board electrical system 16. Moreover, the other third DC to DC converter 32 is connected between the fourth connection 26 and the second low-voltage on-board electrical system 18.

In a third variant of the motor vehicle 2 according to FIG. 3, one of the second DC to DC converters 30 is connected in each case between the first DC to DC converter 28 and the energy storage systems 12, 14, and a third DC to DC converter 32 is connected in each case between the first DC to DC converter 28 and the low-voltage on-board electrical systems 16, 18.

According to the exemplary embodiments of FIGS. 1 to 3, the second DC to DC converters 30 and the third DC to DC converters 32 have an identical design. These are expediently designed as galvanically non-isolating DC to DC converters.

By way of example, these are each designed in FIGS. 1 to 3 as a buck converter, that is, as a step-down converter. As an alternative, the second or third DC to DC converters 30, 32 are designed as buck-boost converters or as boost converters. For example, the second and third DC to DC converters 30, 32 are designed as unidirectional DC to DC converters, and alternatively and preferably the second and third DC to DC converters 30, 32 are each bidirectional DC to DC converters.

The first DC to DC converter 28 for the three variants of the motor vehicle 2 according to FIGS. 1 to 3 comprises a transformer 34 including an (iron) core 36, wherein two first coils 38 and two second coils 40 are wound around the core 36. The two first coils 38 have the same number of windings. The two second coils 40 have the same number of windings. The ratio of the number of windings of the first coils 38 to the number of windings of the second coils 40 is 10:1, for example.

Each of the first coils 38 and each of the second coils 40 is connected to a respective power converter 44, which here, for example, is formed by way of a B4 circuit. The respective power converter thus comprises two switches 42 connected in series, with a center tap between these being connected to a coil end of the respective coils 38 or 40, and two further switches 42 connected, with a center tap between these being connected to the other coil end of these coils 38 or 40. These two series connections are, in turn, connected in parallel to one another, wherein this parallel connection is provided between the connecting points 20a, 20b or 22a, 22b or 24a, 24b or 26a, 26b of the respective connection 20, 22, 24 or 26.

To stabilize the voltage, a capacitor 46 is in each case connected in parallel to the power converters 44.

The power converters 44 are used to convert the energy system-side or low-voltage on-board electrical system-side DC voltage into a transformer-side AC voltage and/or to convert the transformer-side AC voltage into an energy system-side or low-voltage on-board electrical system-side DC voltage.

The first power converter 28 comprises a control unit, which is not shown in greater detail and by way of which the switches of the power converters 44 for converting the DC voltage into the AC voltage, and/or vice versa, are activated.

In summary, the first coils 38 are connected to the first output 20 or to the second output 22 by means of the respective power converter 44. The second coils are connected to the third output 24 or to the fourth output 26 by means of the respective power converter 44.

To further summarize, the first DC to DC converter 28 is a DC to DC converter with galvanic isolation.

Optionally and preferably, the first energy storage system 12 and/or the second energy storage system 14 can be disconnected from the first DC to DC converter 28. For this purpose, switches 48 are connected between the first energy storage system 12 and the second DC to DC converter (FIGS. 1 and 3), or between the first energy storage system 12 and the first DC to DC converter 28 (FIG. 2). Analogously, switches 48 are connected for this purpose between the second energy storage system 14 and the second DC to DC converter (FIGS. 1 and 3), or between the second energy storage system 14 and the first DC to DC converter 28 (FIG. 2).

FIGS. 4 and 5 by way of example show the interconnection of the energy storage systems 12, 14 in the high-voltage battery 8. Here, the two energy storage systems 12, 14 are connected in series with one another (FIG. 4) or parallel to one another (FIG. 5). In both embodiments of the high-voltage battery 8, the first energy storage system 12 can be electrically disconnected from the second energy storage system 14 by way of switches 50.

The present disclosure is not restricted to the above-described exemplary embodiments. Rather, other variants of the present disclosure may be derived therefrom within the scope of the claims by those skilled in the art without departing from the subject matter of the present disclosure. In particular, furthermore all individual features described in connection with the exemplary embodiments and/or in the claims can also be combined with one another in a different manner, without departing from the subject matter of the present disclosure.

LIST OF REFERENCE NUMERALS 2 motor vehicle
4 on-board electrical system
6 high-voltage on-board electrical system
8 high-voltage battery
10 high-voltage consumer
12 first energy storage system
14 second energy energy storage system
16 first low-voltage on-board electrical system
18 second low-voltage on-board electrical system
19 low-voltage consumer
20 first connection
20a, b connecting point
22 second connection
22a, b connecting point
24 third connection
24a, b connecting point
26 fourth connection
26a, b connecting point
28 first DC to DC converter
30 second DC to DC converter
32 third DC to DC converter
34 transformer
36 core 38 first coil
40 second coil
42 switch
44 power converter
46 capacitor
48 switch
50 switch

The invention claimed is:

1. A motor vehicle, comprising:
a high-voltage on-board electrical system comprising a high-voltage battery, the high-voltage battery comprising a first energy storage system and a second energy storage system;
a plurality of low-voltage on-board electrical systems;
a first DC to DC converter configured as a centralized power conversion stage under common control circuitry and having multiple regulated power transfer channels, the first DC to DC converter being operable to selectively exchange power among the first energy storage system, the second energy storage system, and the plurality of low-voltage on-board electrical systems via the respective regulated channels, each channel defining an independent power path,
a second DC to DC converter, coupled to the first DC to DC converter and the first and second energy storage systems for voltage adaptation; and
a third DC to DC converter coupled between the first DC to DC converter and at least one of the plurality of low-voltage on-board electrical systems for voltage adaptation.

2. The motor vehicle according to claim 1, wherein the first energy storage system is configured to be electrically disconnected from the second energy storage system.

3. The motor vehicle according to claim 1, wherein the first DC to DC converter, the second DC to DC converter, and/or the third DC to DC converter comprise a bidirectional DC to DC converter.

4. The motor vehicle according to claim 1, wherein the second DC to DC converter and/or the third DC to DC converter are configured to be galvanically non-isolating.

5. The motor vehicle according to claim 1, wherein the first energy storage system and/or the second energy storage system is configured to be disconnected from the first DC to DC converter.

6. The motor vehicle according to claim 1, wherein the first DC to DC converter is configured as a DC to DC converter with galvanic isolation.

7. The motor vehicle according to claim 1, wherein the first DC to DC converter comprises a transformer including a core, wherein two first coils and two second coils are wound around the core.

8. The motor vehicle according to claim 7, wherein each of the first coils are connected to a respective first and second energy storage system via a power converter for converting a DC voltage into an AC voltage and/or for converting an AC voltage into a DC voltage.

9. The motor vehicle according to claim 8, wherein each of the second coils are connected to a respective one of the plurality of low-voltage networks via a power converter for converting a DC voltage into an AC voltage and/or for converting an AC voltage into a DC voltage.

10. A power system for a motor vehicle, comprising:
a high-voltage on-board electrical system comprising a high-voltage battery, the high-voltage battery comprising a first energy storage system and a second energy storage system;
a plurality of low-voltage on-board electrical systems;
a first DC to DC converter configured as a centralized power conversion stage under common control circuitry and having multiple regulated power transfer channels, the first DC to DC converter being operable to selectively exchange power among the first energy storage system, the second energy storage system, and the plurality of low-voltage on-board electrical systems via the respective regulated channels, each channel defining an independent power path,
a second DC to DC converter, coupled to the first DC to DC converter and the first and second energy storage systems for voltage adaptation; and
a third DC to DC converter coupled between the first DC to DC converter and at least one of the plurality of low-voltage on-board electrical systems for voltage adaptation.

11. The power system according to claim 10, wherein the first energy storage system is configured to be electrically disconnected from the second energy storage system.

12. The power system according to claim 10, wherein the first DC to DC converter, the second DC to DC converter, and/or the third DC to DC converter comprise a bidirectional DC to DC converter.

13. The power system according to claim 10, wherein the second DC to DC converter and/or the third DC to DC converter are configured to be galvanically non-isolating.

14. The power system according to claim 10, wherein the first energy storage system and/or the second energy storage system is configured to be disconnected from the first DC to DC converter.

15. The power system according to claim 10, wherein the first DC to DC converter is configured as a DC to DC converter with galvanic isolation.

16. The power system according to claim 10, wherein the first DC to DC converter comprises a transformer including a core, wherein two first coils and two second coils are wound around the core.

17. The power system according to claim 16, wherein each of the first coils are connected to a respective first and second energy storage system via a power converter for converting a DC voltage into an AC voltage and/or for converting an AC voltage into a DC voltage.

18. The power system according to claim 17, wherein each of the second coils are connected to a respective one of the plurality of low-voltage networks via a power converter for converting a DC voltage into an AC voltage and/or for converting an AC voltage into a DC voltage.

19. A power system for a motor vehicle, comprising:
a high-voltage electrical system comprising a high-voltage battery, the high-voltage battery comprising a first energy storage system and a second energy storage system;
a plurality of low-voltage electrical systems;
a first DC to DC converter configured as a centralized power conversion stage under common control circuitry and having multiple regulated power transfer channels, the first DC to DC converter being operable to selectively exchange power among the first energy storage system, the second energy storage system, and the plurality of low-voltage on-board electrical systems via the respective regulated channels, each channel defining an independent power path,
a second DC to DC converter, coupled to the first DC to DC converter and the first and second energy storage systems for voltage adaptation; and a third DC to DC converter coupled between the first DC to DC converter and at least one of the plurality of low-voltage electrical systems for voltage adaptation.

20. The power system according to claim 19, wherein the first DC to DC converter, the second DC to DC converter, and/or the third DC to DC converter (i) comprise a bidirectional DC to DC converter, and/or (ii) are configured to be galvanically non-isolating.

* * * * *